United States Patent [19]

Taylor et al.

[11] Patent Number: 4,663,917
[45] Date of Patent: May 12, 1987

[54] PACKAGING APPARATUS

[76] Inventors: Alfred A. Taylor; John P. North, both of 34 Lee Street, Condell Park, New South Wales 2200, Australia

[21] Appl. No.: 746,359
[22] Filed: Jun. 19, 1985
[30] Foreign Application Priority Data Jun. 20, 1984 [AU] Australia ............... PG5596

[51] Int. Cl.⁴ ............ B65B 9/12; B65B 51/30
[52] U.S. Cl. ............................. 53/552; 53/373
[58] Field of Search ............ 53/551, 552, 451, 373

[56] References Cited

U.S. PATENT DOCUMENTS

| | | | |
|---|---|---|---|
| 3,070,931 | 1/1963 | Zwight | 53/552 |
| 3,256,673 | 6/1966 | Tew . | |
| 3,262,244 | 7/1966 | Cutler . | |
| 3,438,173 | 4/1969 | Omori | 53/552 X |
| 3,522,689 | 8/1970 | Wylie et al. | 53/552 X |
| 3,629,987 | 12/1971 | Klopfenstein et al. | 53/552 |
| 3,850,780 | 11/1974 | Crawford . | |
| 4,199,919 | 4/1980 | Moscatelli | 53/552 |
| 4,391,081 | 7/1983 | Kovacs | 53/451 X |
| 4,423,585 | 1/1984 | Monsees et al. | 53/451 |
| 4,516,379 | 5/1985 | Iain | 53/552 X |
| 4,524,567 | 6/1985 | Patelli | 53/552 |

FOREIGN PATENT DOCUMENTS 973238 12/1959 Fed. Rep. of Germany .
1456882 12/1976 United Kingdom .

Primary Examiner—James F. Coan
Attorney, Agent, or Firm—Ladas & Parry

[57] ABSTRACT

A sealing and stripping assembly for a packaging apparatus, the assembly includes two shafts which are held in a spaced generally parallel co-extensive relationship with an arm extending from each shaft, and co-operating pairs of closing and stripping bars mounted on the radial extremity of each arm so as to engage a bag material passing through the assembly so as to seal and strip same during a packaging operation, with said arms being driven in synchronism and in opposite rotational directions.

14 Claims, 5 Drawing Figures

PACKAGING APPARATUS

The present invention relates to packaging apparatus and more particularly but not exclusively to packaging apparatus to package food products such as potato crisps.

In the packaging of many products, bag material is delivered, to a sealing head, in tubular form. The product to be packaged, is delivered to the sealing head and is located within the bag material. The bag material is sealed transverse of its longitudinal direction of extension, and then the material is located within the bag material. Thereafter, the tube is closed, a stripping apparatus condenses the volume occupied by the product to be packaged, and the bag material again sealed, so that the packaged material is located within a discrete bag. The bag is then severed from the tubular bag material. This packaging operating is generally intermittent, that is not continuous.

It is a disadvantage of known apparatus that the sealing, closing, stripping and severing of the bag is achieved by relatively complex apparatus which increases the cost of the machine as well as rendering the machine unreliable. Additionally these known apparatus operate intermittently, and accordingly are slow.

It is the object of the present invention to overcome or substantially ameliorate the above disadvantages.

There is disclosed herein a stripping and sealing assembly for a packaging apparatus, said apparatus including a product delivery head, a drive assembly to pass a tubular bag material past said delivery head so that product delivered from said head is located within said tubular bag material, said assembly being openable on a continuous basis and comprising a pair of opposing sealing and stripping means located on opposite sides of said bag material at a position downstream of said delivery head relative to the direction of movement of said bag material through said apparatus, said sealing and stripping means being adapted to cooperate to sealingly close portions of said bag material and strip same, a first arm supporting one of said sealing and stripping means, a second arm supporting the other sealing or stripping mean, and wherein the arms are rotatably driven in synchronism in opposite directions about spaced parallel axes extending generally transverse of the direction of movement of said bag material.

A preferred form of the present invention will now be described by way of example with reference to the accompanying drawings wherein.

Figure 1:
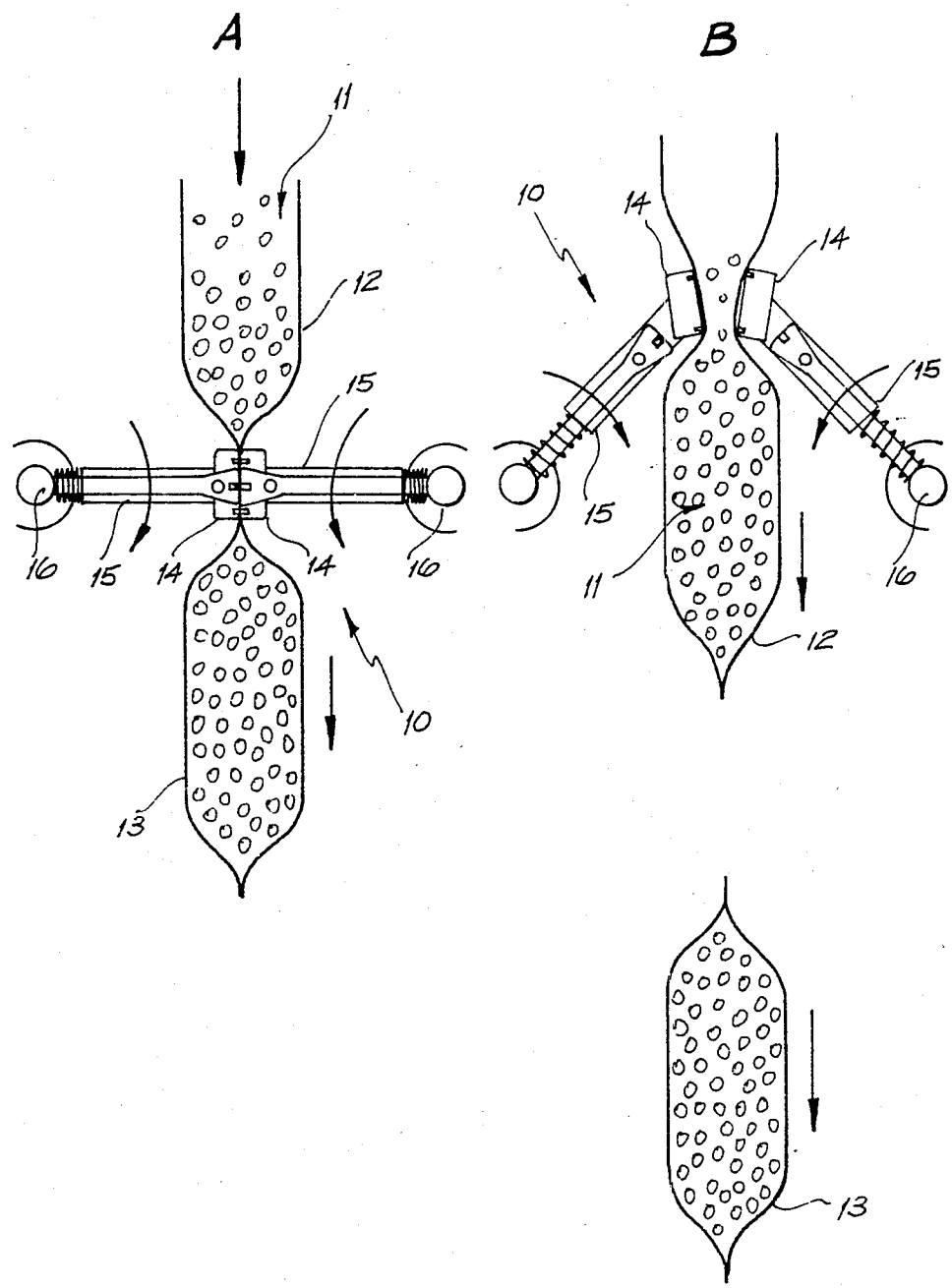
FIGS. 1A and 1B are schematic side views of a sealing, closing and stripping assembly in operation.

In FIG. 1 there is schematically depicted a stripping, closing and sealing assembly 10 to be employed in a packaging machine. The assembly 10 operates in a rotary manner and accordingly can operate on a continuous basis. The packaging machine has a product delivery head which delivers product 11 to the interior of a tubular bag material 12. The sealing, closing and stripping assembly 10 strips the bag material 12 and severs discrete bags 13 from the bag material 12. The assembly 10 includes two opposing sealing, closing and stripping heads 14 which are each mounted on an arm 15 fixed to a shaft 16. The shafts 16 are rotatably driven in opposite directions and have the same angular velocity. The sealing and stripping heads 14 are pivotally mounted on the end of each arm 15 as well as being movable longitudinally of their respective arm 15.

The sequence of operation of the abovedescribed assembly 10 is as follows. Firstly, the tubular bag material 12 is driven past a product delivery head so that the product 11 is delivered to the interior of the tubular material 12. The heads 14 engage the material so as to sealingly close the bag material 12 at a particular position. For example, in position A, the heads 14 are engaging the material 12 and are severing the bag 13 therefrom. Once the bag 13 has been formed and is allowed to fall freely from the assembly 10, the arms 15 rotate to the position B. Thereafter the heads 14 are forced into engagement with the bag material 12 so as to bring the bag material 12 together for stripping and sealing. The two heads 14 are moved toward each other and are moved in the direction of movement of the material 12 at a velocity greater than the velocity of the material 12. Accordingly, the heads 14 will cause stripping of the bag material 12 to thereby reduce the volume occupied by the product 11. Upon the heads 14 reaching a predetermined position, the bag material 12 is sealed so that a fresh bag is thus formed and severed from the reaminder of the material 12.

Figure 2:
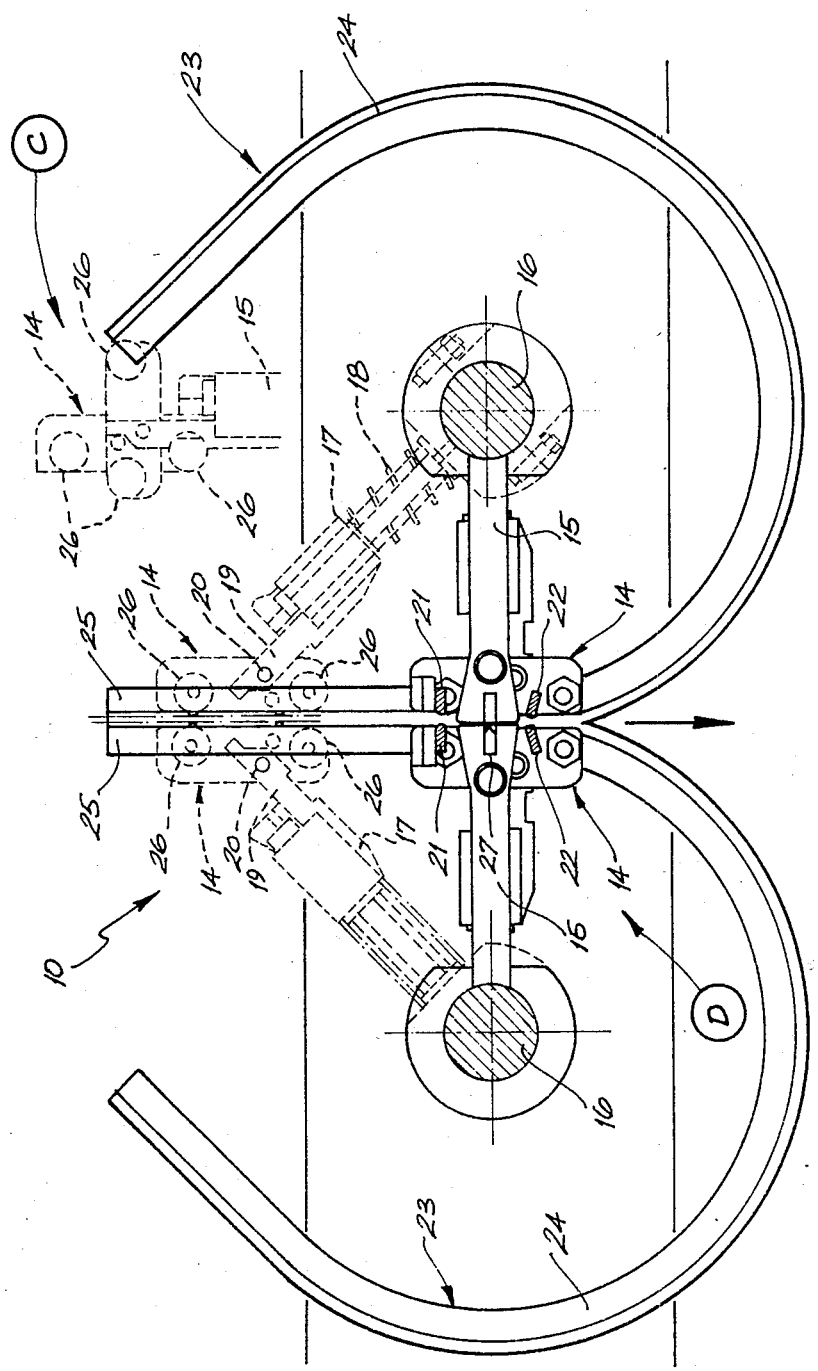
FIG. 2 is a schematic part sectioned side elevation of the sealing, closing and stripping assembly of FIG. 1.
Figure 3:
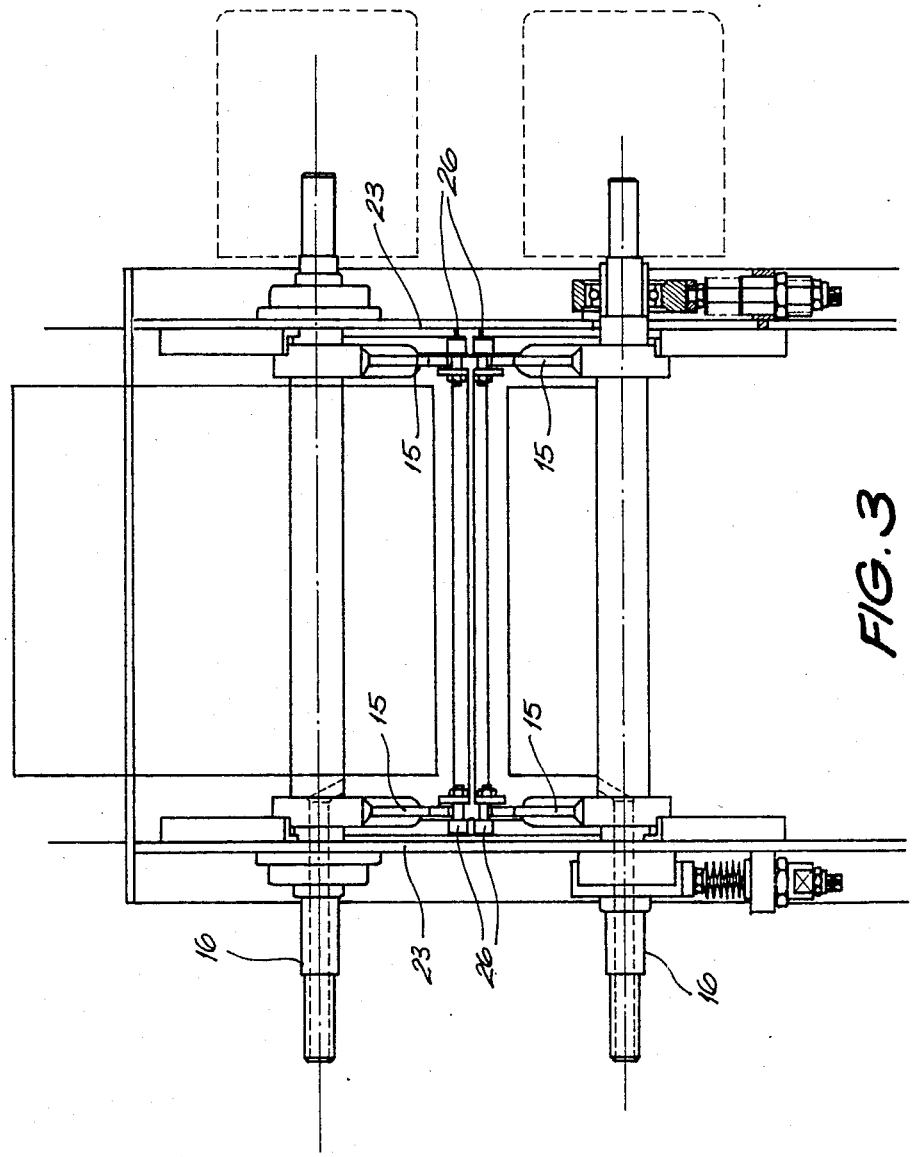
FIG. 3 is a schematic plan view of the sealing, closing and stripping assembly of FIG. 2.

Turning now to FIGS. 2 and 3 wherein the stripping, closing and sealing assembly 10 is more fully depicted. The sealing heads 14 are mounted on a carriage 17 which is telescopically located on the shaft 15. More particularly, the carriage 17 is spring biased by the spring 18 to a position at the radially outer end of the arms 15. Each of the carriages 17 has an arm 19 to which the sealing and stripping heads 14 are pivotally attached by means of pins 20. Each head 14 is provided with a closing bar 21 and a stripper bar 22.

Surrounding the shafts 16 are two cam tracks 23 which have a curved portion 24 and a linear portion 25 extending generally parallel to and adjacent to the bag material 12. Each of the heads 14 is provided with a pair of cam followers 26 which engage the cam track 23 so that in cooperation therewith the sealing and stripping heads 14 follow a predetermined path. The cam followers 26 are eccentrically mounted so that the distance between the heads 14 is adjustable. Accordingly, in operation, the heads 14 follow a generally linear path defined by the linear portion 25 of the cam track 23 while the bag material 12 is engaged. Thereafter, the heads 14 move from contact with the bag material 12 and follow the curved portion 24 of the cam track 23. Upon reaching the terminal end of the curved portion 24, the heads 14 move to the position C depicted in FIG. 2. Once in this position, the closing bars 21 will contact the bag material 12 prior to the stripping bars. Upon the bag material 12 being engaged, the heads 14 are driven at a speed faster than the bag material so that the product 11 in the bag material 12 is compacted. As the heads 14 reach the position D depicted in FIG. 2, the bag material 12 is sealed and the newly formed bag 13 severed from the bag material 12.

On the radially outer end of one of the arms 15 there is provided a knife 27 which severs the bag material 12 to release the bag 13 while additionally, the radially outer ends of the arms 15 operate as sealing jaws in that they are heated so as to sealingly close the bag material 12 prior to the bag 13 being severed from the material 12. It should be appreciated that other means apart from heating could be used to seal the bar, such as the use of adhesives.

Figure 4:
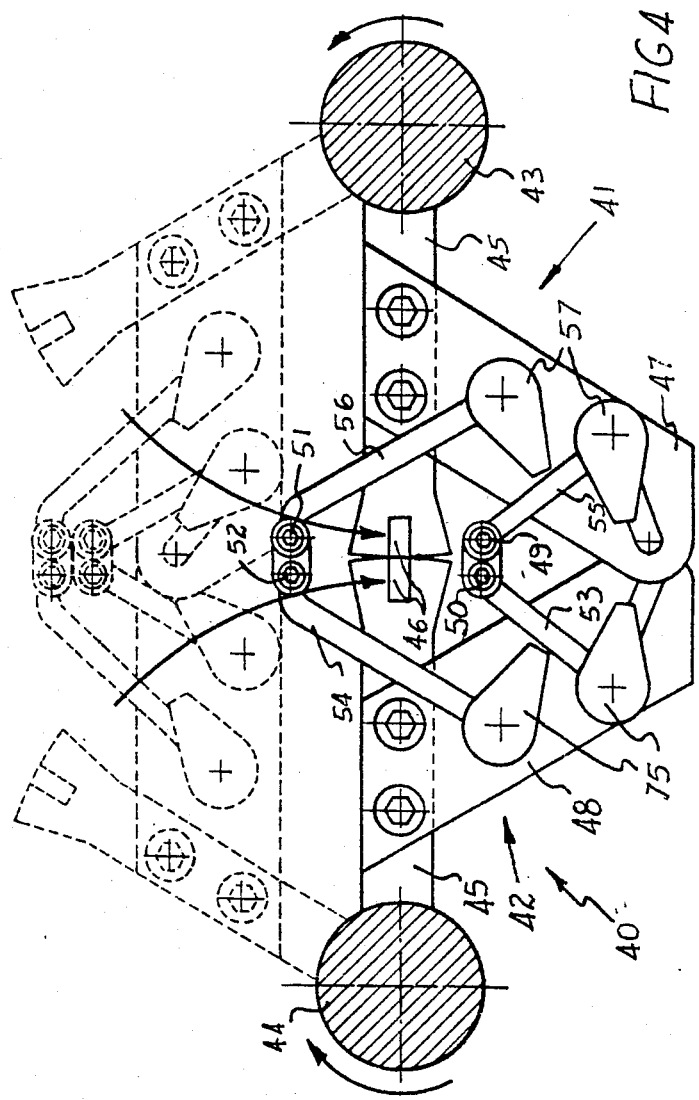
FIG. 4 is a schematic part sectioned side elevation of a further sealing, closing and stripping assembly to that of FIG. 1.
Figure 5:
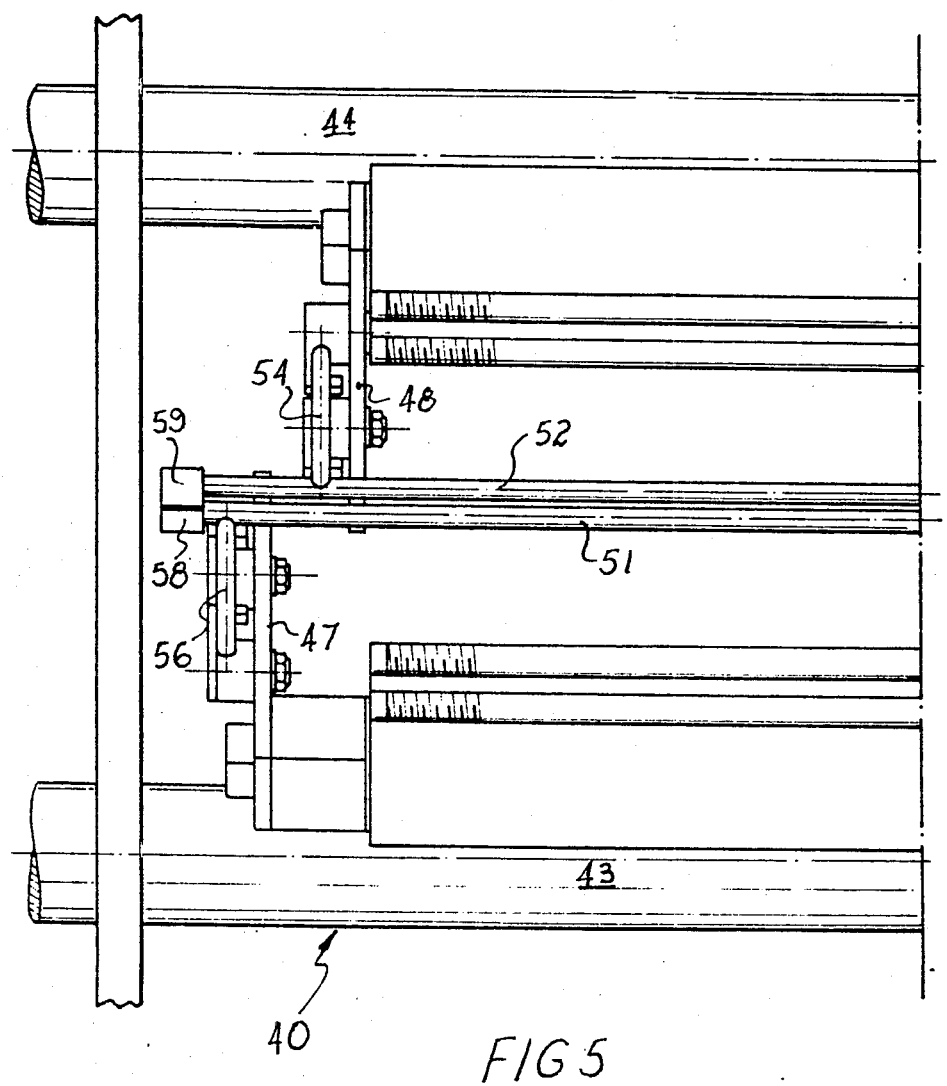
FIG. 5 is a schematic plan view of a portion of the sealing, closing and stripping assembly of FIG. 4.

In FIGS. 4 and 5 there is schematically depicted a sealing, closing and stripping head assembly 40 including a pair of opposing closing and stripping heads 41 and 42 mounted on two rotatably driven shafts 43 and 44 which are driven in opposite directions and at the same angular velocity. Each of the heads 41 and 42 includes a pair of arms 45, with each pair of arms 45 being provided at its radially outer extremity with a knife assembly 46, which assemblies 46 are also heated in order to seal the bag material passing therethrough in a similar manner to the assembly 10 described with reference to FIGS. 1 to 3. The arms 45 extend radially from the axis of rotation of the respective shaft 43 or 44. Each of the arms 45 is provided with a support 47 or 48, which supports 47 and 48 receive tube closing and stripper bars 49 to 52. The stripper bars 49 and 50 being supported respectively by arms 55 and 53, and tube closer bars 51 and 52 being supported respectively by arms 56 and 54. Each of the arms 53 to 56 is supported by a pivot assembly 57 which allows rotation of each of the arms 53 to 56 about an axis fixed relative to its associated arm 47 or 48. Additionally, the pivot assemblies 57 resiliently bias the arms 53 to 56 to a position relative to their supports 47 and 48, as depicted in "ghostlines" in FIG. 4.

The stripper and tube closer bars 49 and 51 are both provided with a plug member 58 while the stripper and tube closer bars 50 and 52 are provided with a socket member 59. During movement of the two pairs of arms 45 when the stripper bars 49 and 50, and tube closer bars 51 and 52 are engaged during a stripping action relative to the tubular bag material, the associated pairs of plug members 58 and socket members 59 are engaged. This ensures that the pairs of stripper bars 49 and 50, and tube closer bars 51 and 52 are held in the correct relative positions.

As the arms 45 rotate and the stripper bars and tube closer 49 to 52 approach each other, each pair of stripper bars 49 and 50, and tube closer bars 51 and 52 are located adjacent each other in order to inhibit the location of any product between the two pairs of stripper bars. Once the stripper bars are engaged, further rotation of the arms 45 causes the two paris (51, 52 and 49, 50) of stripper and tube closer bars to separate longitudinally of the bag material to thereby provide a space of bag material which is free from product, which space of bag material is then engaged by the assemblies 46. This ensures that when the individual bags are sealed and removed from the tubular material there is no product which would hinder sealing and separation.

To provide the stripping action, at least the two bars 49 and 50 would have a velocity greater than the velocity of the tubular bag material while in contact therewith. Preferably all four bars 49 to 52 would have a velocity greater than the bag material.

What we claim is:

1. A stripping and sealing assembly for packaging apparatus, said apparatus including a product delivery head, a drive assembly to pass a tubular bag material past said delivery head so that product delivered from said head is located within said tubular bag material, said assembly including a pair of opposing sealing and stripping means located on opposite sides of said bag material at a position downstream of said delivery head relative to the direction of movement of said bag material through said apparatus, said sealing and stripping means being adapted to cooperate to sealingly close portions of said bag material and strip same, a first arm means supporting one of said sealing and stripping means, a second arm means supporting the other sealing and stripping means, and wherein the arms are rotatably driven in synchronism in opposite directions about spaced parallel axes extending generally transverse of the direction of movement of said bag material so that prior to sealing said bag material said sealing and stripping means are moved along said bag material to strip same.

2. The assembly of claim 1, wherein said axes are defined by two rotatably driven shafts, with said first arm means extending radially from a first one of said shafts, and said second arm means extending radially from a second of said shafts, and wherein said shafts are rotatably driven in opposite rotational directions.

3. The assembly of claim 2, wherein each sealing and stripping means includes a sealing member and a cutting member which cooperate to sealingly close portions of said bag material and to sever said sealed portions from said bag material to thereby form discrete bags of said product with said sealing member and cutting member of each sealing and stripping means being located on the radial extremity of the associated arm means.

4. The assembly of claim 3, wherein the sealing and stripping means include a pair of co-operating stripper bars, with said one sealing and stripping means including one of the stripper bars and said other sealing and stripping means including the other stripper bar, and further including a pair of tube closing bars with a closing bar mounted on said first arm means and the other closing bar mounted on said second arm means so as to co-operate in closing said tubular bag material at a position upstream thereof relative to said stripper support bars, support means extending from each arm means, which support means movably supports the stripper and closing bars to provide for separating relative movement between said closing and stripper bars during closing and stripping of said tubular material with at least said stripper bars having a velocity greater than the bag material and greater than the velocity of the closing bars while in contact with the tubular material.

5. The assembly of claim 4, wherein each support means includes a pair of support members fixed to their associated shaft and four support arms pivotally attaching the associated stripper and closing bars to said support member, and further including means biassing each support arm to a predetermined position relative to its associated support member.

6. The assembly of claim 5, wherein the support arms are pivotally attached to their support member and are rotatable about axes parallel to said shafts, with the support arm axes being spaced from each other both angularly and radially relative to the associated shaft.

7. The assembly of claim 3, wherein each tube closing and stripping means includes a sealing and stripping head, with each head having a closing bar and a stripping bar extending generally transverse to the tubular bag material.

8. The assembly of claim 7, further including a first mounting means pivotally attached to the radial extremity of said first arm means and supporting one of the closing bars and one of the stripping bars in a spaced fixed relationship relative to each other, a second mounting means pivotally attached to the radial extremity of the other arm means and supporting the other closing bar and other stripping bar in a fixed relationship relative to each other.

9. The assembly of claim 8, wherein each mounting means is resiliently biased to a predetermined working relationship so that the closing bars engage the bag material first.

10. The assembly of claim 9, wherein said arms are rotatably driven so that said stripping and sealing heads have a velocity greater than the velocity of said tubular bag material when engaged therewith.

11. The assembly of claim 8, further including track means to guide said sealing and stripping heads during operation thereof.

12. The assembly of claim 11, wherein each mounting means is radially movable relative to its associated supporting arm.

13. The assembly of claim 4 wherein the stripper bars are mounted so as to rotate about parallel axes extending transverse of the general direction of movement of the bag material.

14. The assembly of claim 4 wherein during an operation the bag material with the product engages with the stripper bars prior to engagement with the closing bars so that the product in the bag material is compacted prior to closing of the bag.

* * * * *